US008914255B2

(12) United States Patent
Hedlund et al.

(10) Patent No.: US 8,914,255 B2
(45) Date of Patent: Dec. 16, 2014

(54) METHOD, APPARATUS, AND COMPUTER PROGRAM PRODUCT FOR FOCUS PREDICTION

(75) Inventors: Sven Hedlund, Genarp (SE); Benny Klein, Bara (SE)

(73) Assignee: Cella Vision AB, Lund (SE)

( * ) Notice: Subject to any disclaimer, the term of this patent is extended or adjusted under 35 U.S.C. 154(b) by 375 days.

(21) Appl. No.: 13/097,330

(22) Filed: Apr. 29, 2011

(65) Prior Publication Data

US 2011/0270580 A1 Nov. 3, 2011

(30) Foreign Application Priority Data

Apr. 30, 2010 (EP) .................................... 10161595

(51) Int. Cl.
*H03F 1/26* (2006.01)
*G03B 13/00* (2006.01)
*H04N 5/232* (2006.01)
*G02B 21/24* (2006.01)
*G02B 21/36* (2006.01)

(52) U.S. Cl.
CPC ............ *G02B 21/244* (2013.01); *G02B 21/365* (2013.01)
USPC ............ 702/189; 348/345; 348/348; 348/353

(58) Field of Classification Search
CPC ......... G06F 15/00; G06F 17/00; G06F 17/18; G02B 21/002; G02B 21/244; G02B 21/245; G02B 21/365; H04N 5/23212

USPC ............ 702/189, 94, 95, 134, 150, 159, 181; 348/345, 348, 353; 396/95

See application file for complete search history.

(56) References Cited

U.S. PATENT DOCUMENTS

2009/0195688 A1  8/2009  Henderson et al.

OTHER PUBLICATIONS

J.E. Fischer, et al; "High Speed AutoFocus for Microscopic Images", MVA '92 IAPR Workshop on Machine Vision Applications, Dec. 7-9, 1992, Tokyo, pp. 223-226.
European Search Report: dated Jun. 30, 2010; Appln. No. EP 10 16 1595.

*Primary Examiner* — Michael Nghiem
*Assistant Examiner* — Yoshihisa Ishizuka
(74) *Attorney, Agent, or Firm* — Ladas & Parry LLP

(57) ABSTRACT

The present invention relates to a method, an analyzer and a computer program product for focus prediction in a sample arranged on a measuring surface of an analyzer. The method comprises row wise scanning sample positions by means of an optical system of said analyzer, said sample positions being positions in a coordinate system for said measuring surface containing said sample, for the first sample position on each row, determining a focus and storing said focus, and for each subsequent sample position: if a stored difference exists, predicting a focus by adding said stored difference to said stored focus, or if no stored difference exists, determining a focus and storing said focus.

13 Claims, 5 Drawing Sheets

(a)

(b)

METHOD, APPARATUS, AND COMPUTER PROGRAM PRODUCT FOR FOCUS PREDICTION

TECHNICAL FIELD

The present invention relates to the field of microscopic digital imaging and in particular to a method, an analyzer and a computer program product for focus prediction.

BACKGROUND

In microscopic digital imaging of specimen, a typical area of interest for a digital scan of a specimen is 6×6 mm. The resolution needed for clinical purposes is typically 5 pixels/μm leading to a total image map of 30000×30000 pixels=900·$10^6$ pixels. Using 24-bit colour, this corresponds to an image map of approximately 3 GB. This data can be collected using a motorized microscope with an attached digital imaging device.

When trying to increase speed of microscopic digital imaging, a problem to solve is the transfer rate of image data—the larger image data, the longer time it takes to transfer the image data. Another problem to overcome is the capacity demanding focusing of the focusing system. Acquiring sharp images at these magnifications constitutes a challenge due to the narrow depth of field. The focus surface, the collection of points where an image of the sample is acquired in focus (i.e. the image is sharp), has to be determined with great accuracy.

One way of determining a focus for a point in the sample is by acquiring a set of images of the point in the sample and varying the distance between the sample and the optical system for every image. The image with best focus is selected using for example a relative focus metric.

Let the specimen to be examined extend in an x- and y-direction and have a thickness in a z-direction. In an ideal world with perfect hardware (zero tolerances, straight bearings, no play, etc) and perfect plane smears of the specimen to be examined—the focus surface would be a plane. For a dense smear in a machine with ideal hardware, the fastest way to image an area would be to first determine focus at three different (x, y)-positions spread far apart. Then, using the three resulting (x, y, z)-points, the focus surface would be estimated and all images of this surface could be acquired without further focus determination. However, the focus surface in real digital microscopes using high magnification (e.g. 50× and 100×) is often quite rugged, especially if inexpensive parts are used in the mechanical system. Moreover, this surface structure can change with every slide. The trade-off between focus quality and speed is challenging since on one hand a careful focus determination at each position will give good focus quality but take long time. But, on the other hand, acquiring an image directly at a guessed, predicted, or estimated z-position at each position will not take long but give poor focus quality.

One of the keys to fast image acquisition is to have a good prediction function of the focus surface; the better the prediction, the less time is spent on collecting a sharp image at each position.

A common method to acquire a good z-prediction is to build a focus map in a separate step prior to scanning. The focus map is based on a number of focus positions, which can be determined either manually or automatically. However, these methods are time consuming for complex focus surfaces since the focus map needs to be based on many focus positions in order to give a good prediction.

Thus, there is a need for a prediction method that combines cost-efficiency with high transfer speed and precision.

SUMMARY OF THE INVENTION

In view of the above, an objective of the invention is to solve or at least reduce one or several of the drawbacks discussed above.

Generally, the above objective is achieved by the attached independent patent claims.

According to a first aspect, the present invention is realized by a method for focus prediction in a sample arranged on a measuring surface of an analyzer. The method comprises: row wise scanning sample positions by means of an optical system of said analyzer, said sample positions being positions in a coordinate system for said measuring surface containing said sample, for the first sample position on each row, determining a focus and storing said focus, and for each subsequent sample position: if a stored difference exists, predicting a focus by adding said stored difference to said stored focus, or if no stored difference exists, determining a focus and storing said focus.

Focuses can be predicted in a capacity-efficient and accurate way without having any information in advance about mechanical inaccuracies of the optical system. This can be accomplished even when cost-efficient parts are used in the analyzer.

The method may comprise that a stored difference exists for a subsequent sample position in relation to a preceding sample position if focus has been determined for a corresponding preceding sample position on a preceding row and for a corresponding subsequent sample position on said preceding row and a difference between these focuses has been calculated and stored.

This is advantageous in that previously determined information is used which is capacity-efficient.

The method may further comprise that a stored difference exists for a subsequent sample position if a stored difference exists for each pair of adjacent positions between and comprising the first sample position and said subsequent sample position.

This is advantageous in that the method is flexible in that the difference can also consist of a sum of differences between adjacent sample positions.

This is also advantageous in that the method is flexible in that the stored difference can consist of a sum of differences between pairs of adjacent positions for which not all pairs are on the same row.

The method may further comprise that that said each pair of adjacent positions are on the same row.

The method may further comprise that a difference exists for each pair of adjacent sample positions if focuses have been determined for corresponding pair of adjacent sample positions on a preceding row and a difference between these focuses has been calculated and stored.

The method may further comprise that a result from a threshold function determines whether a focus for a sample position is to be determined instead of predicted even if a stored difference exists.

This is advantageous in that the focus prediction is made more accurate.

The method may further comprise determining which positions in the coordinate system for said measuring surface are sample positions containing said sample.

Only scanning sample positions is capacity-efficient when sparse specimens are scanned, that is a specimen not covering the entire measuring surface, since processing capacity is not wasted on predicting focus for positions in the measuring surface where no sample is present.

According to a second aspect, the present invention is realized by an analyzer for focus surface prediction. The analyzer comprises: a measuring surface arranged for receiving the sample, an optical system connected to a processor and arranged to scan sample positions row wise, said sample positions being positions in a coordinate system for said measuring surface containing said sample, wherein the processor is arranged to, for the first sample position on each row, determine a focus using said optical system and store said focus, and wherein for each subsequent sample position: if a stored difference exists, the processor is arranged to predict a focus by adding said stored difference to said stored focus, or if no stored difference exists, the processor is arranged to determine a focus using said optical system and store said focus.

The analyzer may further comprise that a stored difference exists for a subsequent sample position in relation to a preceding sample position if the processor has determined a focus using said optical system for a corresponding preceding sample position on a preceding row and for a corresponding subsequent sample position on said preceding row and if the processor has calculated and stored a difference between these focuses.

The analyzer may further comprise that a stored difference exists for a subsequent sample position if a stored difference exists for each pair of adjacent sample positions between and comprising the first sample position and said subsequent sample position.

The analyzer may further comprise that a difference exists for each pair of adjacent sample positions if the processor has determined focuses using said optical system for corresponding pair of adjacent sample positions on a preceding row and if the processor has calculated and stored a difference between these focuses.

The analyzer may further comprise a threshold module arranged to determine whether the processor is to determine a focus for a sample position instead of predict even if a stored difference exists.

The analyzer may further comprise that said processor is arranged to determine which positions in a coordinate system for said measuring surface are sample positions containing said sample.

The advantages of the first aspect are equally applicable to the second aspect.

The embodiments of the first aspect are equally applicable to the second aspect.

According to a third aspect, the present invention is realized by a computer program product, comprising computer program code which is stored on a computer-readable storage medium and which, when executed on a processor, carries out the method according to the first aspect of the invention.

The embodiments of the first aspect are equally applicable to the third aspect.

The advantages of the first aspect are equally applicable to the third aspect of the invention.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF AN EMBODIMENT

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
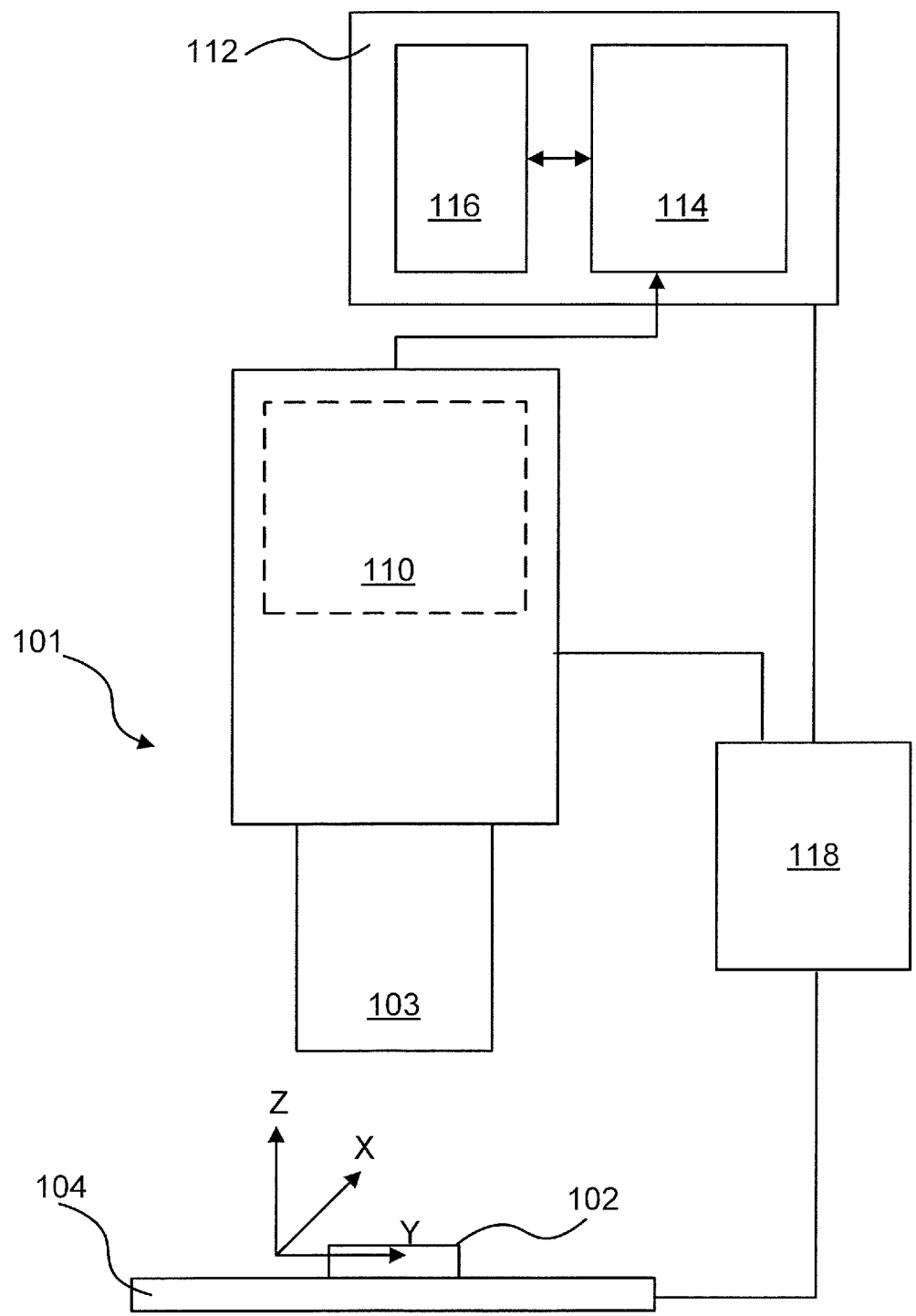
FIG. 1 is a side view of an analyzer according to the invention.

FIG. 1 discloses an analyzer 100 comprising an optical system 101 having an objective 103, a slide 102 constituting the measuring surface for receiving a sample and a processing device 112. The slide 102 can be arranged in a slide holder 104. The sample covers the slide partly or entirely.

Let the relative coordinate system be defined as in FIG. 1. Thus, the coordinate system is such that motions in the z-direction are parallel to the optical axis of the optical system 101 while motions in the x- and y-directions are orthogonal to each other and to the optical axis of the optical system 101. It is to be noted that this coordinate system is given by way of example and that other coordinate systems are possible, e.g. polar coordinates are possible as well.

The slide 102 can be translated in three dimensions (x, y, z) relatively to the optical system 101. Alternatively, the slide 102 can be translated in two dimensions (x, y) relatively to the optical system 101 and the objective 103 can be translated along the third dimension (z). A steering motor system 118 connected to the slide holder 104 and the optical system 101 can be arranged to provide for the translations of the slide 102 and/or the objective 103. The steering motor system 118 can be connected to the processing device 112 and be controlled by the processing device 112. The processing device 112 may be an external apparatus, such as a personal computer. Alternatively, the processing device 112 may be incorporated in the analyzer 100.

The processing device 112 comprises a processor 114, associated with a memory 116, configured to predict focuses. This process is further illustrated in FIG. 4.

The optical system 101 may further comprise an image acquiring device 110 arranged to capture image data depicting the sample in the slide 102. The image acquiring device 110 can for example be a CCD (charged coupled device) camera.

Figure 2:
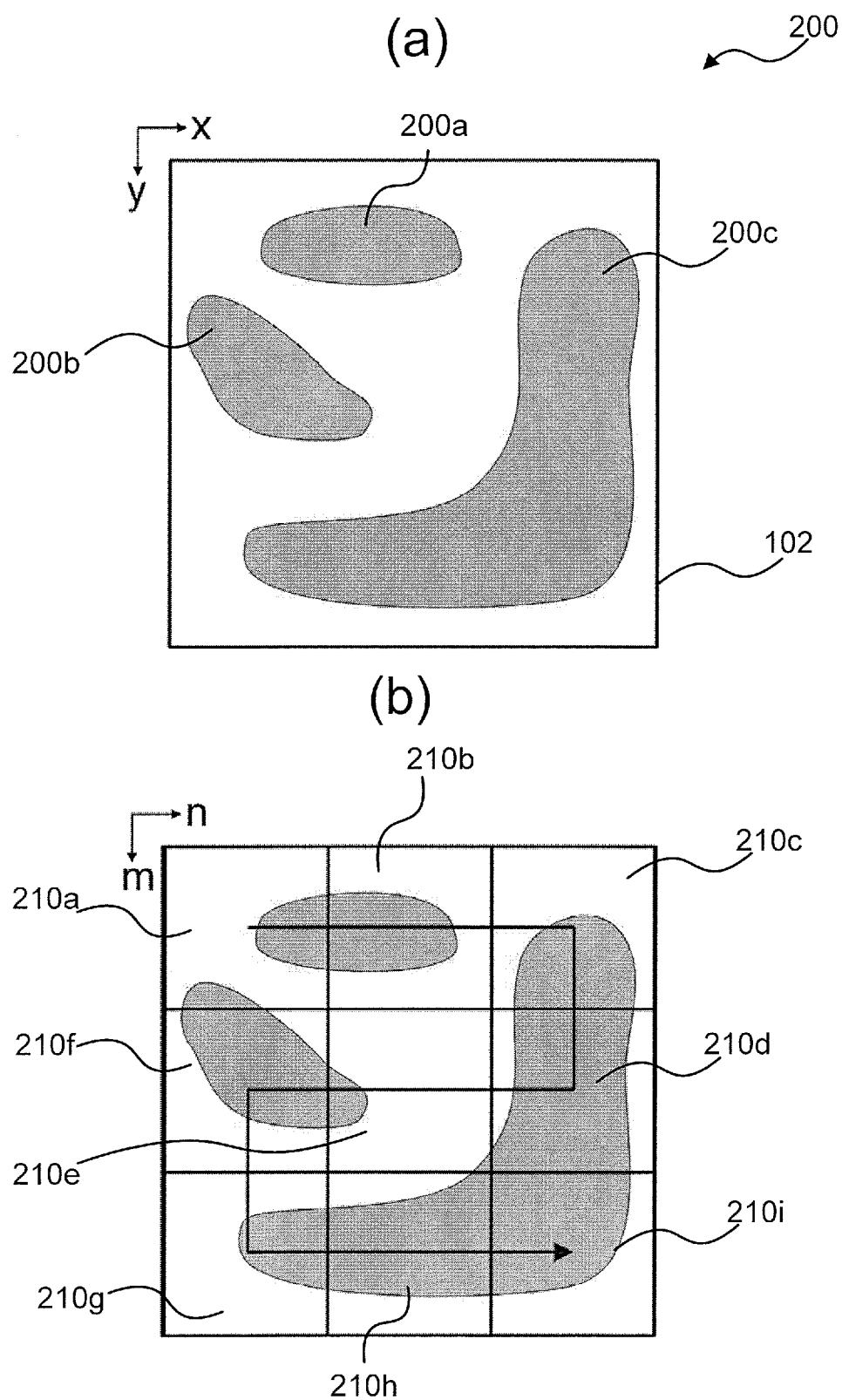
FIG. 2a illustrates a sample to be examined.
FIG. 2b illustrates the sample of FIG. 2a covered by a virtual grid and in what order it is to be scanned.
Figure 3:
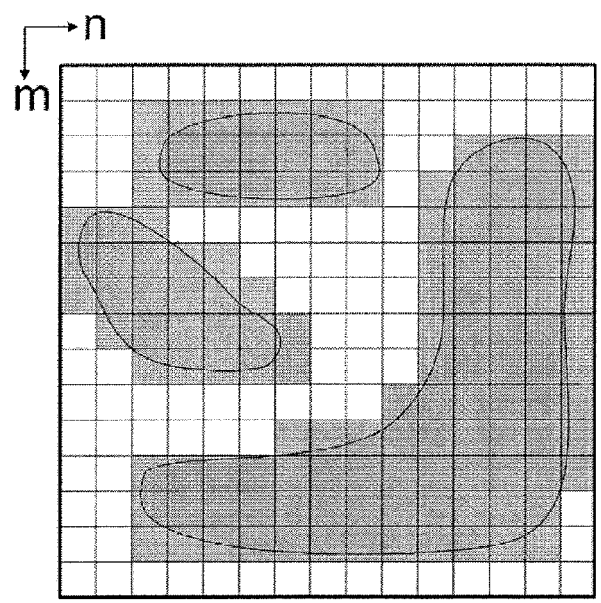
FIG. 3a illustrates the sample of FIG. 2a-b covered by a virtual grid of higher resolution.
FIG. 3b illustrates in what order the sample of FIG. 3b is to be scanned.
Figure 3:
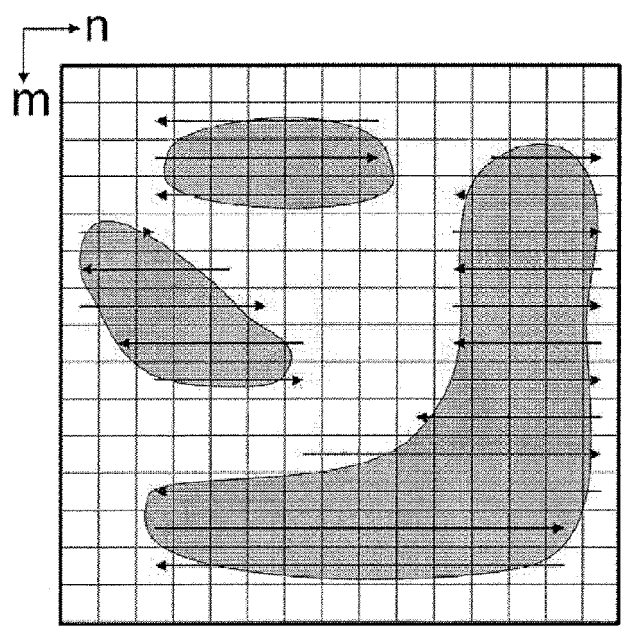

When imaging a sample usually an array of overlapping images is collected in a predetermined order followed by stitching the images together to a large map. One order of collecting the images could be according to the following:

FIG. 2a discloses a sample 200 to be examined arranged on a slide 102. FIG. 2b discloses FIG. 2a together with a virtual grid in which $1 \leq n \leq N$ and $1 \leq m \leq M$ and N=M=3 wherein m is the row number and n is the column number. The images can be collected in the order as is shown in FIG. 2b by scanning the squares row by row. For odd rows the column number is gradually increased and for even rows the column number is gradually decreased (it is to be noted that other orders of scanning the squares are possible). This can be expressed as follows:

Let (x, y) denote an arbitrary position on the slide 102 where x and y are real numbers, see FIG. 2a. Let in FIG. 2b (m, n) denote a discrete position in the virtual grid. Then x and y can be expressed as $x=x_0+n \cdot \Delta x$ and $y=y_0+m \cdot \Delta y$. $\Delta x$ and $\Delta y$ are chosen such that the images overlap slightly to be able to stitch them together to a large map. In FIG. 2ab and FIG. 3ab, the image acquiring device 110 is assumed to be quadratic (therefore the squares are quadratic).

The sequence number function s which decides in what manner the squares are visited is then defined as $$s(m, n) = \begin{array}{l} (m-1) \cdot N + n, \text{ if } m \text{ is odd} \\ m \cdot N + 1 - n, \text{ if } m \text{ is even} \end{array}$$

The sample 200 to be examined may be arranged on the slide 102 by smearing the sample 200 onto the slide 102. If the sample 200 is centrifuged before arranging it on the slide 102 it may, when arranged on the slide 102, separate into a plurality of sample fields 200a, 200b, and 200c. Hence, the slide 102 which constitutes the measuring surface may be covered only partly by the sample 200. Even if FIG. 2a and FIG. 2b disclose three sample fields 200a, 200b, and 200c it is understood that the sample 200 may separate into any number of sample fields.

Before predicting the focus surface, information about the at least one sample field may be collected. For example, at least one image 210a-210i of the sample 200 can be acquired, see FIG. 2b. This at least one image 210a-210i is preferably acquired at a low resolution, such as for example 10× magnification, in order to minimize processing capacity. The at least one image 210a-210i can then be processed using for example thresholding so that it can be determined which parts of the slide 102 are covered by at least one sample field. It is understood that other image processing techniques known to the skilled person can be used as well. It is also understood that the at least one image can be collected in other orders than the one displayed in FIG. 2b. The information about which parts of the slide 102 that are covered by a sample field, i.e. which positions are sample positions, can be used in the focus prediction. This is advantageous in that if a sparse specimen is scanned, i.e. a specimen not covering the entire measuring surface, processing capacity and time is not wasted on predicting focuses for parts of the measuring surface where no sample 200 is present. It is to be understood that the determination of which positions of the measuring surface are sample positions (covered by a sample field) are not necessary for the realization of the invention. Furthermore, this determination can be performed in various ways.

The information about which positions of the measuring surface that are sample positions can be used as in FIG. 3a and FIG. 3b. A virtual high magnification grid is laid on top of the low magnification map, see FIG. 3a. Based on the content of each square in the grid, the squares determined to be sample positions are shaded. For these shaded squares, the sample positions, corresponding focuses will be determined or predicted. Denote the set of sample positions $(m,n) \in T \subset N_1 \times N_1$, wherein $N_1 \times N_1$ are all pairs of positive integers (m,n) except 0.

FIG. 3b shows one way of scanning the sample positions. Here, as in FIG. 2b, the squares are scanned row by row. For odd rows the column number is gradually increased and for even rows the column number is gradually decreased. However, the positions that are not sample positions are left out. If $(m_i, n_i) \in T$ is the i-th scanned position in FIG. 3b, then $s(m_{i-1}, n_{i-1}) < s(m_i, n_i) < s(m_{i+1}, n_{i+1})$. Note that due to the higher magnification, M=N=15 in FIG. 3b. It is to be noted that the positions can be scanned row wise in any way, e.g. in the x-direction or y-direction.

It is to be noted that another way of row wise scanning the sample positions could include that positions that are not sample positions are not left out. This means that all positions of the measuring surface are scanned.

The focus surface of a sample can be defined as the collection of points where an image of the sample is acquired in focus (i.e. the image is sharp). A focus is a point in space where a sharp image of the corresponding point in the sample can be acquired. Where the sharp image can be acquired can be determined using a relative focus metric. The focus surface can be described with a function f as z=f(x, y) or f(m, n) in the discrete grid where $1 \leq m \leq M$ and $1 \leq n \leq N$. The better prediction of f the quicker can sharp images be acquired.

One way of determining and imaging the focus of a position (m, n) of an image is herein referred to as z-scanning:

By z-scanning at position (m, n) is meant that a set of images are acquired in a z-surrounding of an estimated focus $\hat{f}(m,n)$, e.g. at $\hat{f}(m,n)+K \cdot \Delta z$, $\hat{f}(m,n)+(K-1) \cdot \Delta z$, ..., $\hat{f}(m,n)-K \cdot \Delta z$. The image with best focus, i.e. the sharpest image, is selected using a relative focus metric. The focus quality of a z-scanned image is good as long as K is big enough to correct for prediction errors and as long as $\Delta z$ is less than the depth of field of the images. K is the width of the z-scanning. The better the focus surface can be predicted, the smaller can K be. If for example the determination of $\hat{z}=\hat{f}(m,n)$ has an uncertainty of W then an appropriate choice of K would be approximately $W/\Delta z$.

Inexpensive hardware is usually less accurate than expensive hardware. Hence, when moving the slide 102 and/or the optical system 101 mechanical errors are introduced due to the inaccuracy of the hardware. Even if the mechanical errors are small they have a large effect on the accuracy due to the high magnifications used. If the hardware would have been ideal with no errors nor tolerances, the focus surface function f would be constant over the entire sample.

It has been found that the deviations introduced due to mechanical inaccuracies of the optical system can be divided in a first component in a first direction, e.g. an x-direction and a second component in a second direction, e.g. a y-direction. In other words, there is no focus surface cross coupling between the x-direction and the y-direction, i.e. $f(x, y)=g_x(x)+g_y(y)$.

Figure 4:
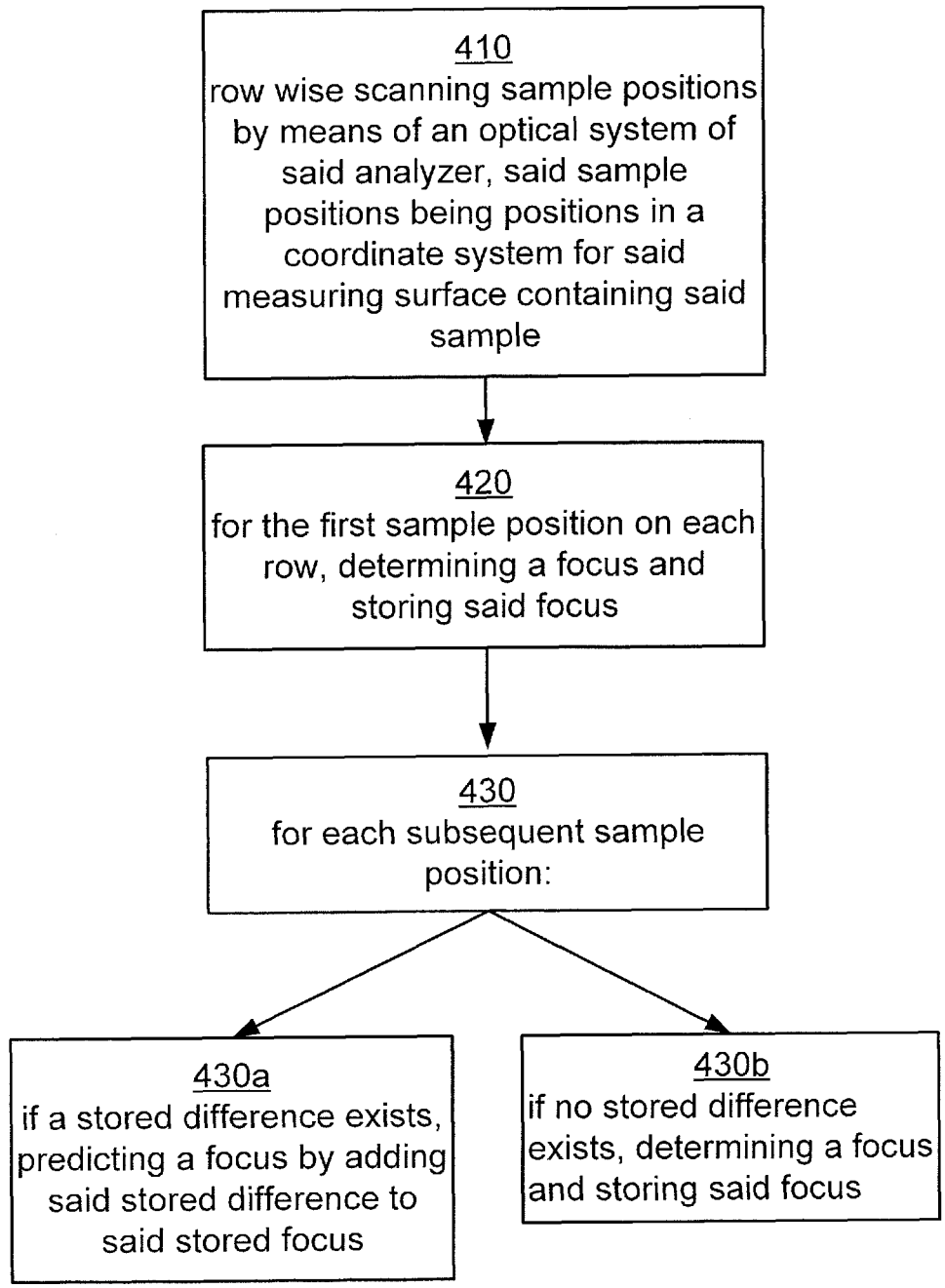
FIG. 4 illustrates the inventive method.

In the following, the inventive method for focus surface prediction in a sample arranged on a measuring surface of an analyzer 100 will be explained with reference to FIG. 4. The sample can be a sparse specimen, i.e. the sample comprises at least one sample field and the measuring surface is not entirely covered.

Optionally, it is determined which positions in a coordinate system for said measuring surface are sample positions containing said sample. The sample is first examined at a low magnification, for example 10×, in order to determine which positions in a coordinate system for the measuring surface are sample positions containing the sample. For the parts of the slide 102 not comprising at least one sample field the focus surface prediction will not be performed in order to save capacity and time. One way of determining which positions in a coordinate system for said measuring surface that are sample positions containing said sample has been described in connection with FIGS. 2 and 3 but it is to be understood by the skilled person that various other methods could be used.

Sample positions are scanned row wise by means of the optical system 101 of said analyzer 100 410. This scanning is performed at a greater magnification such as for example 50×. The sample can be scanned in the order displayed in FIG. 3b. It is however understood that the sample can be scanned in other manners as well. It could for example be scanned column wise. It is apparent to the skilled person that the manner of scanning the points in the sample can be varied. All positions of the measuring surface can be scanned. If only sample positions are scanned this decreases the time spent and the capacity used.

For the first sample position on each row, a focus is determined and stored 420.

For each subsequent sample position 430: if a stored difference exists, a focus is predicted by adding said stored difference to said stored focus 430a. If no stored difference exists, a focus is determined and stored 430b. Said difference is the difference in the z-direction between the focus of the subsequent sample position in relation to the focus of a preceding sample position in the same row. Please note that between the subsequent sample position and the preceding sample position there may be positions not being sample positions. Please also note that the stored difference may consist of a sum of differences between each pair of adjacent positions between and comprising the first sample position and said subsequent sample position.

The difference is calculated by either subtracting the focus of the subsequent sample position from the preceding sample position or vice versa.

The inventive method can also be described as follows:

Define the function t where t(i) gives the i-th discrete sample position to scan, i.e. let t: $N_1 \rightarrow T$ such that $s(t(k)) < (s(t(k+1))$ for all integers k such that $1 \leq k < |T|$.

Construct a difference vector $\Delta g_x$ for storing N−1 integers and initialize all elements to "empty". Let $m_s$, $n_s$, and $z_s$ be variables that always keep track of the latest z-scanned position.

1. Initialize i=1, z-scan the first position, $(m_i, n_i)=t(i)$, let $z_s=f(m_i, n_i)$, $m_s=m_i$, $n_s=n_i$, and let i=i+1.

2. Treat the next position $(m_i, n_i)=t(i)$: if $m_i \neq m_s$ or if any of the difference vector elements $\Delta g_x (\min(n_i, n_s))$, $\Delta g_x (\min(n_i, n_s)+1)$, ..., $\Delta g_x (\max(n_i, n_s)-1)$ is empty then go to 3, otherwise go to 4.

3. Z-Scan: Let $m_s^{old}=m_s, n_s^{old}=n_s, z_s^{old}=z_s$. Z-scan: $(m_i,n_i)$ and let $z_s=f(m_i, n_i)$, $m_s=m_i$, $n_s=n_i$. If $m_s=m_s^{old}$ and $|n_s-n_s^{old}|=1$, then update $\Delta g_x$: if $n_s > n_s^{old}$, let $\Delta g_x(n_s^{old})=z_s-z_s^{old}$, otherwise let $\Delta g_x(n_s^{old})=z_s^{old}-z_s$. Go to 5.

4. Grab: if $n_i > n_s$ then let $$\hat{z}_i = z_s + \sum_{p=n_s}^{n_i-1} \Delta g_x(p),$$

otherwise let $$\hat{z}_i = z_s - \sum_{p=n_i}^{n_s-1} \Delta g_x(p).$$

Grab an image at position $(m_i, n_i, \hat{z}_i)$.

5. Let i=i+1. If $i \leq |T|$, go to 2.

Figure 5:
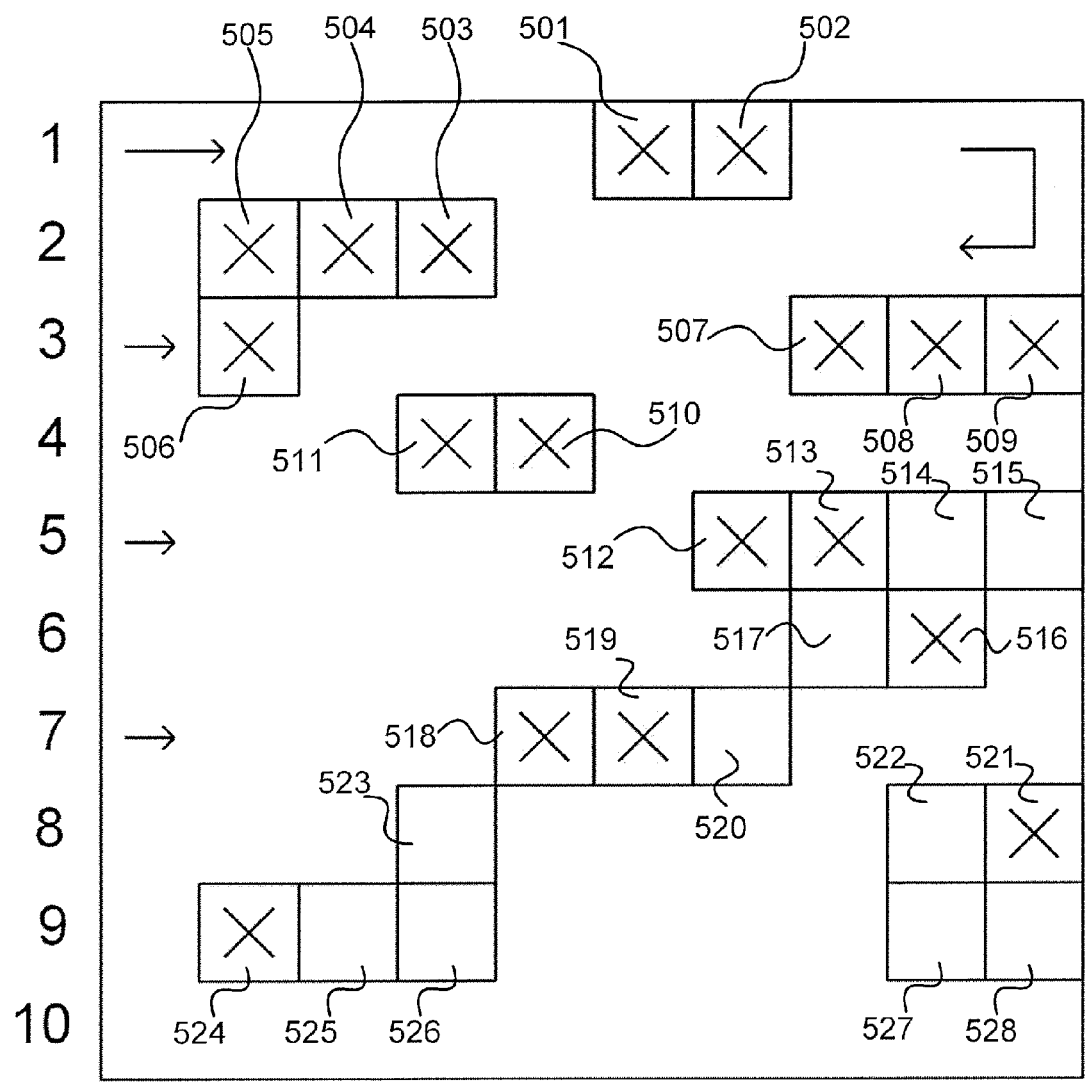
FIG. 5 illustrates an example of performing the inventive method.

An example of the inventive method follows with reference to FIG. 5. The arrows indicate the order of the scanning in this specific example. The numbers to the left of the image indicate row numbers.

The position 501 is the first sample position in row 1. Thus, focus is determined and stored for this position. It has been described above that the focus can be determined in various ways which are known to the skilled person.

The scanning then continues to the subsequent sample position 502. Since no stored difference exists, the focus of sample position 502 is determined and stored. After that a difference is calculated between the focus of the sample position 501 and sample position 502. The calculated difference including sign is stored. The differences can for example be stored in a vector. It is however to be noted that other storage means are possible and well known to the skilled person. The memory 116 can be used for storing e.g. differences, determined focuses, vectors containing differences.

The scanning then continues on the next row since there are no more sample positions in row 1. It is to be noted that the order of the scanning in FIG. 5 is only one example of how the sample could be scanned row wise. It is apparent that the sample could also be scanned column wise and all positions, not only the sample positions, could be scanned. It is also to be noted that this is simply one example of the order and direction of the scanning of the rows.

In row 2, position 503 is the first sample position. Thus, focus is determined and stored for this position. For the subsequent sample positions 504 and 505 no stored differences exist which implies that the focuses of sample positions 504 and 505 are determined and stored as are the differences including signs between sample positions 503, 504, and 505 respectively.

In row 3, position 506 is the first sample position and thus focus is determined and stored for this position. For the subsequent sample positions (positions 507, 508 and 509) in row 3 no stored differences exist and hence the focuses and the differences must be determined and stored.

In row 4, position 510 is the first sample position and thus focus is determined and stored for this position. For the subsequent sample position 511 no stored difference exists. Hence, focus is determined and stored for sample position 511. Then a difference can be calculated between sample positions 510 and 511 and stored with its sign.

In row 5, position 512 is the first sample position and thus focus is determined and stored for this position. For the subsequent sample position 513 no stored difference exists. Hence, focus is determined and stored for sample position 513. Then a difference can be calculated between sample positions 512 and 513 and stored with its sign. For the subsequent sample position 514 a stored difference exists. The difference was calculated and stored when scanning row 3—the difference between the focuses of sample positions 507 and 508. Thus, the focus of sample position 514 is predicted by adding to the determined focus of sample position 513 the stored difference between sample positions 507 and 508 which corresponds to the difference between sample positions 513 and 514. This is possible, as outlined above, since there is no focus surface cross coupling between the x-direction and the y-direction, i.e. $f(x, y)=g_x(x)+g_y(y)$. In FIG. 5 the boxes representing e.g. sample positions 514 and 515 do not comprise a cross. The cross symbolizes that a focus must be determined whereas no cross indicates that focus can be predicted using the inventive method.

Next, in row 6, position 516 is the first sample position and thus focus is determined and stored for this position. For the subsequent sample position 517 a stored difference exists. This difference was calculated and stored when scanning row 3—the difference between the focuses of sample positions 507 and 508. Thus, the focus of sample position 517 is predicted by adding including sign to the determined focus of sample position 516 the stored difference between sample positions 507 and 508 corresponding to the difference between sample positions 516 and 517.

In row 7, position 518 is the first sample position and thus focus is determined and stored for this position. For the subsequent sample position 519 no stored difference exists. Hence, focus is determined and stored for sample position 519. Then a difference can be calculated between sample positions 518 and 519 and stored with its sign. For the subsequent sample position 520 a stored difference exists. The difference was calculated and stored when scanning row 1—the difference between the focuses of sample positions 501 and 502. Thus, the focus of sample position 520 is predicted by adding to the determined focus of sample position 519 the stored difference between sample positions 501 and 502 corresponding to the difference between sample positions 519 and 520.

In row 8, position 521 is the first sample position and thus focus is determined and stored for this position. For the subsequent sample position 522 a stored difference exists. The difference was calculated and stored when scanning row 3—the difference between the focuses of sample positions 508 and 509. Thus, the focus of sample position 522 is predicted by adding to the determined focus of sample position 521 the stored difference between sample positions 508 and 509 corresponding to the difference between sample positions 521 and 522.

For the subsequent sample position 523 a stored difference also exists. The difference comprises differences determined in row 3 (between sample positions 508 and 509 and 507 and 508, respectively), row 5 (between sample positions 512 and 513), row 1 (between sample positions 501 and 502), row 7 (between sample positions 518 and 519), and row 4 (between sample positions 510 and 511). Thus, the focus of sample position 523 is predicted by adding to the determined focus of sample position 521 all these stored differences.

In row 9, position 524 is the first sample position and thus focus is determined and stored for this position. For the subsequent sample position 525 a stored difference exists. The difference was calculated and stored when scanning row 2—the difference between the focuses of sample positions 504 and 505. Thus, the focus of sample position 525 is predicted by adding to the determined focus of sample position 524 the stored difference.

For the subsequent sample position 526 a stored difference exists consisting of several differences. The differences were calculated and stored when scanning row 2—the differences between the focuses of sample positions 503, 504 and 505 respectively. Thus, the focus of sample position 526 is predicted by adding to the determined focus of sample position 524 the stored differences.

For the subsequent sample position 527 a stored difference exists consisting of several differences. The differences were calculated and stored when scanning row 2 (the differences between the focuses of sample positions 503, 504 and 505 respectively), row 4 (between sample positions 510 and 511), row 7 (between sample positions 518 and 519), row 1 (between sample positions 501 and 502), row 5 (between sample positions 512 and 513), and row 3 (between sample positions 507 and 508). Thus, the focus of sample position 527 is predicted by adding to the determined focus of sample position 524 the stored differences.

For the subsequent sample position 528 a stored difference exists consisting of several differences similarly as for sample position 527. A further stored difference to be added is the one determined in row 3 between sample positions 508 and 509.

Since the assumption that $f(x, y)=g_x(x)+g_y(y)$ is only approximate, the focus surface prediction may be less accurate with increasing distance from the latest focus determination. Moreover, all focus determinations are made with some granularity ($\Delta z$), which also gives the accuracy or uncertainty of $\hat{f}$. An uncertainty vector can store the corresponding uncertainty of each stored difference. It is also possible to store a time stamp vector that for each difference stores the row number where it was calculated. The above vectors can then be used to estimate an uncertainty accompanying each focus prediction. If the uncertainty is too high this can trigger that a new focus determination is performed. This in turn leads to updating the stored difference with a new difference calculated using the determined focus. The uncertainty can also affect the depth, K, in the focus determination—higher uncertainty leads to larger scans in order to be able to determine focus. The uncertainty vector can be exemplified as follows:

Whenever a difference is stored, the row number where the difference was calculated is stored. Assume that differences older than seven rows are considered unreliable, i.e. for focus prediction on row 9 only differences stored from rows 2-8 are used. As outlined above, the focus of sample position 524 is determined. The stored differences for sample positions 525 and 526 are considered reliable since they are (9−2=) 7 rows old, and hence no new focus determination is needed. The accumulated differences to the subsequent sample position 527 do however contain a difference that was calculated at row 1. Since this stored difference is (9−1=) 8 rows old, a new focus determination is performed for sample position 527. Finally, there is no need for a focus determination for sample position 528, since the stored difference for this sample position is only 6 rows old.

When a focus has been predicted, an image can be acquired at the focus.

Optionally, the focus prediction method above can be used together with a pre-prediction. The pre-prediction is preferably performed for every analyzer since different analyzers have different mechanical deviations. During the pre-prediction the deviations from a perfect plane in the x- and y-direction are measured at a low magnification. These deviations are used as basis for determining a rough estimate of focus surface variation due to mechanical inaccuracies of the analyzer. This rough estimate could for example be a minimum square error based estimate of a plane. It is apparent that other estimates, for example a quadratic equation without cross-coupling, are also possible.

The result of the pre-prediction, that is the estimate, can be used to simplify and quicken the focus determination. During e.g. z-scanning, instead of scanning the whole distance that the objective can move in the z-direction in order to find the focus, the scanning is limited to the estimate for example the minimum square error based estimate of a plane.

It is to be noted that the x-, y-, and z-directions are used herein to increase the readability of the disclosure. It is to be understood that the aspects of the invention are not limited to these directions.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. Method for focus prediction in a sample arranged on a measuring surface of an analyzer, comprising:
    row wise scanning sample positions of the sample by means of an optical system of said analyzer, said sample positions being positions in a coordinate system for said measuring surface containing said sample,
    for a first sample position on each row, determining a focus of the first sample position using the optical system and storing the position and focus of the first sample position as a latest determined focus position and a latest determined focus, respectively, and
    for each subsequent sample position:
    determining whether there exists a stored focus difference for the subsequent sample position in relation to the latest determined focus position based on differences in focus between adjacent sample positions which have been stored so far during, but not before, the row wise scanning of the sample, and
    if a stored focus difference exists, predicting a focus of the subsequent sample position by adding said stored focus difference to the latest determined focus, or
    if no stored focus difference exists, determining a focus of the subsequent sample position using the optical system, storing the focus and position of the subsequent sample position as the latest determined focus position and the latest determined focus, respectively, and if a focus has been determined and stored by using the optical system for an adjacent sample position on the same row, calculating and storing a difference in focus between the subsequent sample position and the adjacent sample position.

2. Method according to claim 1, wherein the step of determining whether there exists a stored focus difference for a subsequent sample position in relation to the latest determined focus position further comprises:
    determining if a difference in focus has been stored for each pair of adjacent positions between and comprising the latest determined focus position and said subsequent sample position so far during the row wise scanning.

3. Method according to claim 2, further comprising determining that a difference in focus has been stored for each pair of adjacent sample positions if focuses have been determined for corresponding pair of adjacent sample positions on a preceding row and a difference between these focuses has been calculated and stored.

4. Method according to claim 1, further comprising a result from a threshold function determining whether a focus for a subsequent sample position is to be determined by using the optical system instead of being predicted by adding said stored focus difference to the latest determined focus value even if a stored focus difference exists.

5. Method according to claim 1 further comprising determining which positions in the coordinate system for said measuring surface are sample positions containing said sample.

6. Method according to claim 1, wherein the step of determining whether there exists a stored focus difference for a subsequent sample position in relation to the latest determined focus position comprises:
    determining if focus has been determined for a position on a preceding row corresponding to the latest determined focus position,
    determining if focus has been determined for a position on said preceding row corresponding to the subsequent sample position, and
    determining if a difference between these focuses has been calculated and stored.

7. A computer program product, comprising a non-transitory computer-readable storage medium having computer code and which, when executed on a processor, carries out the method according to claim 1.

8. An analyzer for focus surface prediction in a sample comprising:
    a measuring surface arranged for receiving the sample,
    an optical system connected to a processor and arranged to scan sample positions of the sample row wise, said sample positions being positions in a coordinate system for said measuring surface containing said sample,
    wherein the processor is arranged to,
    for the first sample position on each row, determine a focus of the first sample position using said optical system and store the position and focus of the first sample position as a latest determined focus position and a latest determined focus, respectively, and for each subsequent sample position:
    determine whether there exists a stored focus difference for the subsequent sample position in relation to the latest determined focus position based on differences in focus between adjacent sample positions which have been stored so far during, but not before, the row wise scanning of the sample, and
    if a stored focus difference exists, the processor is arranged to predict a focus of the subsequent sample position by adding said stored focus difference to the latest determined focus, or
    if no stored focus difference exists, the processor is arranged to determine a focus of the subsequent sample position using said optical system, store the focus and position of the subsequent sample position as the latest determined focus position and the latest determined focus, respectively, and if a focus has been determined using the optical system and stored for an adjacent sample position on the same row, calculate and store a difference in focus between the subsequent sample position and the adjacent sample position.

9. Analyzer according to claim 8, wherein the processor is arranged to determine whether there exists a stored focus difference for a subsequent sample position in relation to the latest determined focus position by:
    determining if a difference in focus has been stored for each pair of adjacent sample positions between and comprising the latest determined focus position and said subsequent sample position so far during the row wise scanning.

10. Analyzer according to claim 9, wherein the processor is further arranged to determine that a difference in focus has been stored for each pair of adjacent positions if the processor has determined focuses using said optical system for corresponding pair of adjacent sample positions on a preceding row and if the processor has calculated and stored a difference between these focuses.

11. Analyzer according to claim 8, further comprising a threshold module arranged to determine whether the processor is to determine a focus for a subsequent sample position using the optical system instead of predicting a focus for the subsequent sample position by adding said stored focus difference to the latest determined focus value even if a stored focus difference exists.

12. Analyzer according to claim 8, wherein said processor is arranged to determine which positions in a coordinate system for said measuring surface are sample positions containing said sample.

13. Analyzer according to claim 8, wherein the processor is arranged to determine whether there exists a stored focus difference for a subsequent sample position in relation to the latest determined focus position by:
- determining if a focus has been determined using said optical system for a position on a preceding row corresponding to the latest determined focus position,
- determining if a focus has been determined using said optical system for a position on said preceding row corresponding to the subsequent sample position, and
- determining if a difference between these focuses has been calculated and stored.

* * * * *